United States Patent
Miyoshi

(10) Patent No.: US 10,827,172 B2
(45) Date of Patent: Nov. 3, 2020

(54) INFORMATION PROCESSING APPARATUS, INFORMATION PROCESSING METHOD, AND INFORMATION PROCESSING PROGRAM

(71) Applicant: FUJITSU LIMITED, Kawasaki-shi, Kanagawa (JP)

(72) Inventor: Hidenobu Miyoshi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/123,475

(22) Filed: Sep. 6, 2018

(65) Prior Publication Data
US 2019/0089954 A1    Mar. 21, 2019

(30) Foreign Application Priority Data

Sep. 19, 2017   (JP) .................. 2017-179066

(51) Int. Cl.
| | |
|---|---|
| *H04N 19/117* | (2014.01) |
| *H04N 19/105* | (2014.01) |
| *H04N 19/513* | (2014.01) |
| *H04N 19/176* | (2014.01) |
| *H04N 19/159* | (2014.01) |
| *H04N 19/126* | (2014.01) |
| *H04N 19/31* | (2014.01) |

(52) U.S. Cl.
CPC ......... *H04N 19/117* (2014.11); *H04N 19/105* (2014.11); *H04N 19/126* (2014.11); *H04N 19/159* (2014.11); *H04N 19/176* (2014.11); *H04N 19/513* (2014.11); *H04N 19/31* (2014.11)

(58) Field of Classification Search
CPC .. H04N 19/117; H04N 19/105; H04N 19/513; H04N 19/31; H04N 19/159; H04N 19/126; H04N 19/176
See application file for complete search history.

(56) References Cited

U.S. PATENT DOCUMENTS

| | | |
|---|---|---|
| 2014/0050270 A1 | 2/2014 | Lim et al. |
| 2014/0140416 A1 | 5/2014 | Yamazaki et al. |

(Continued)

FOREIGN PATENT DOCUMENTS

| | | |
|---|---|---|
| JP | 2012-175527 | 9/2012 |
| JP | 2016-146667 | 8/2016 |
| JP | 2016-201824 | 12/2016 |

*Primary Examiner* — Dave Czekaj
*Assistant Examiner* — Berteau Joisil
(74) *Attorney, Agent, or Firm* — Fujitsu Patent Center

(57) ABSTRACT

An apparatus includes a memory and one or more processors. The processors code each block in a frame of moving images with use of a reference image. The processors generate a decoded image by decoding a coded block and calculate evaluation values for selection of each type of offset filtering. The processors also determine whether the block to be coded is a static region and make an adjustment in the evaluation value on the first offset filtering, based on a layer position of the reference image in a time direction upon a determination that the block to be coded is the static region. The processors also select the type of offset filtering based on the evaluation value on first offset filtering having undergone the adjustment and the evaluation values on second offset filtering and third offset filtering and carry out the selected offset filtering for the decoded image.

16 Claims, 7 Drawing Sheets

(56) References Cited

U.S. PATENT DOCUMENTS

2014/0301463 A1* 10/2014 Rusanovskyy ........ H04N 19/52
                                                375/240.14
2015/0215617 A1*  7/2015 Leontaris ............... H04N 19/82
                                                375/240.03
2015/0350666 A1* 12/2015 Kovacevic ........... H04N 19/503
                                                382/173

* cited by examiner

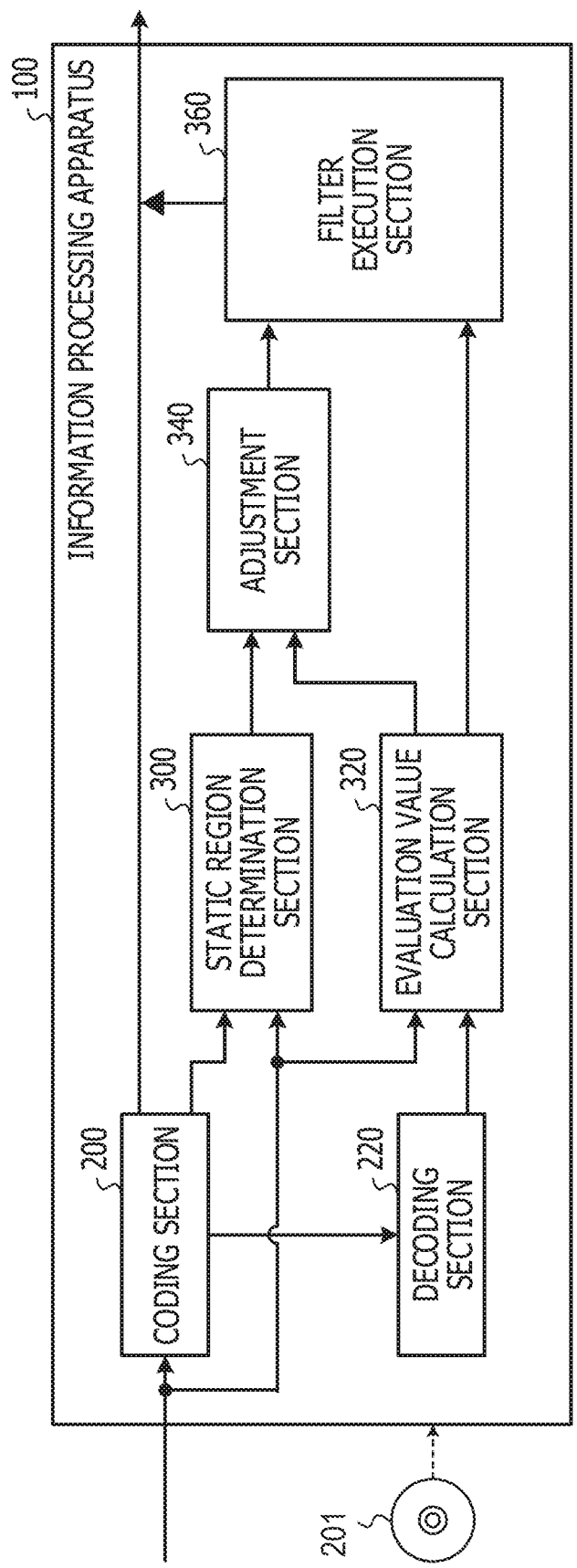

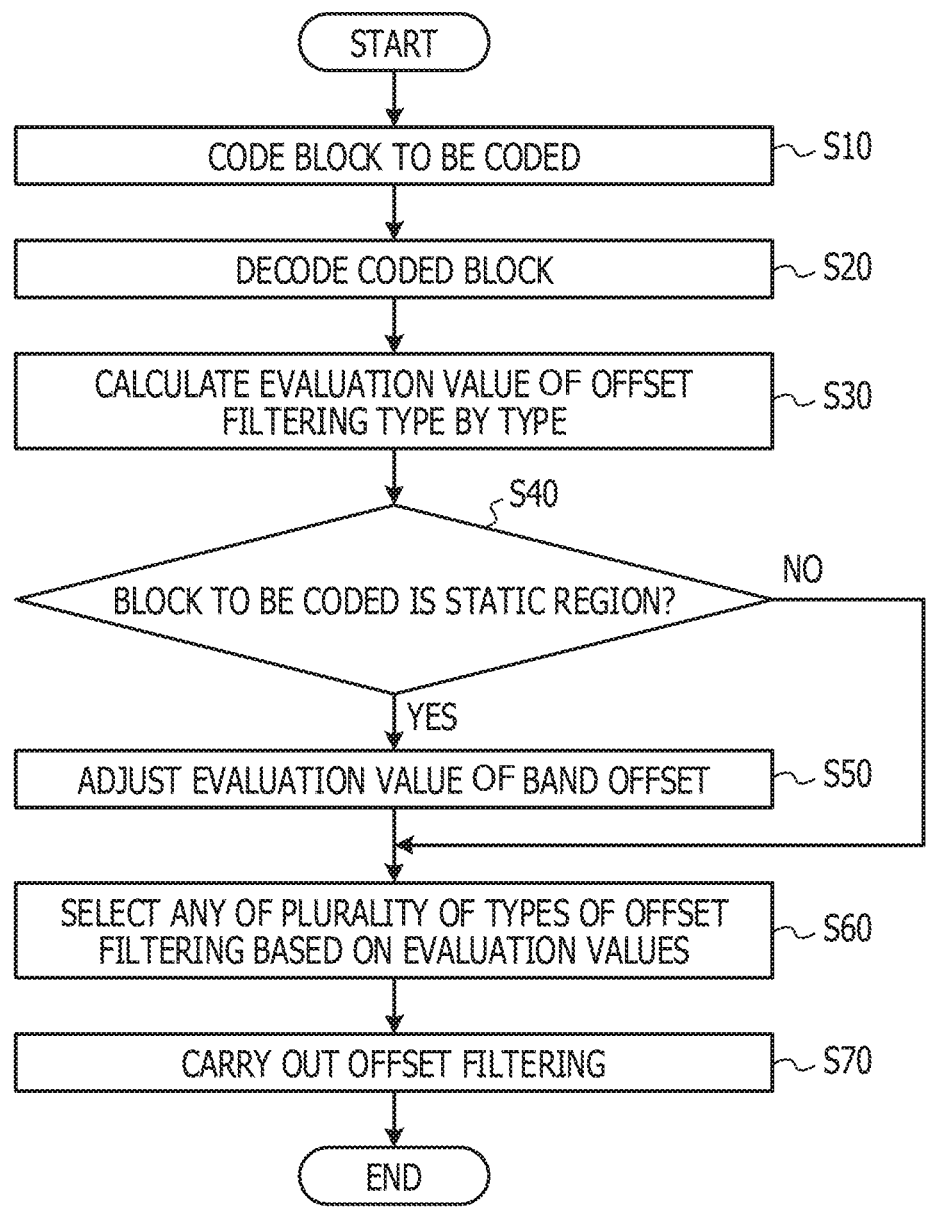

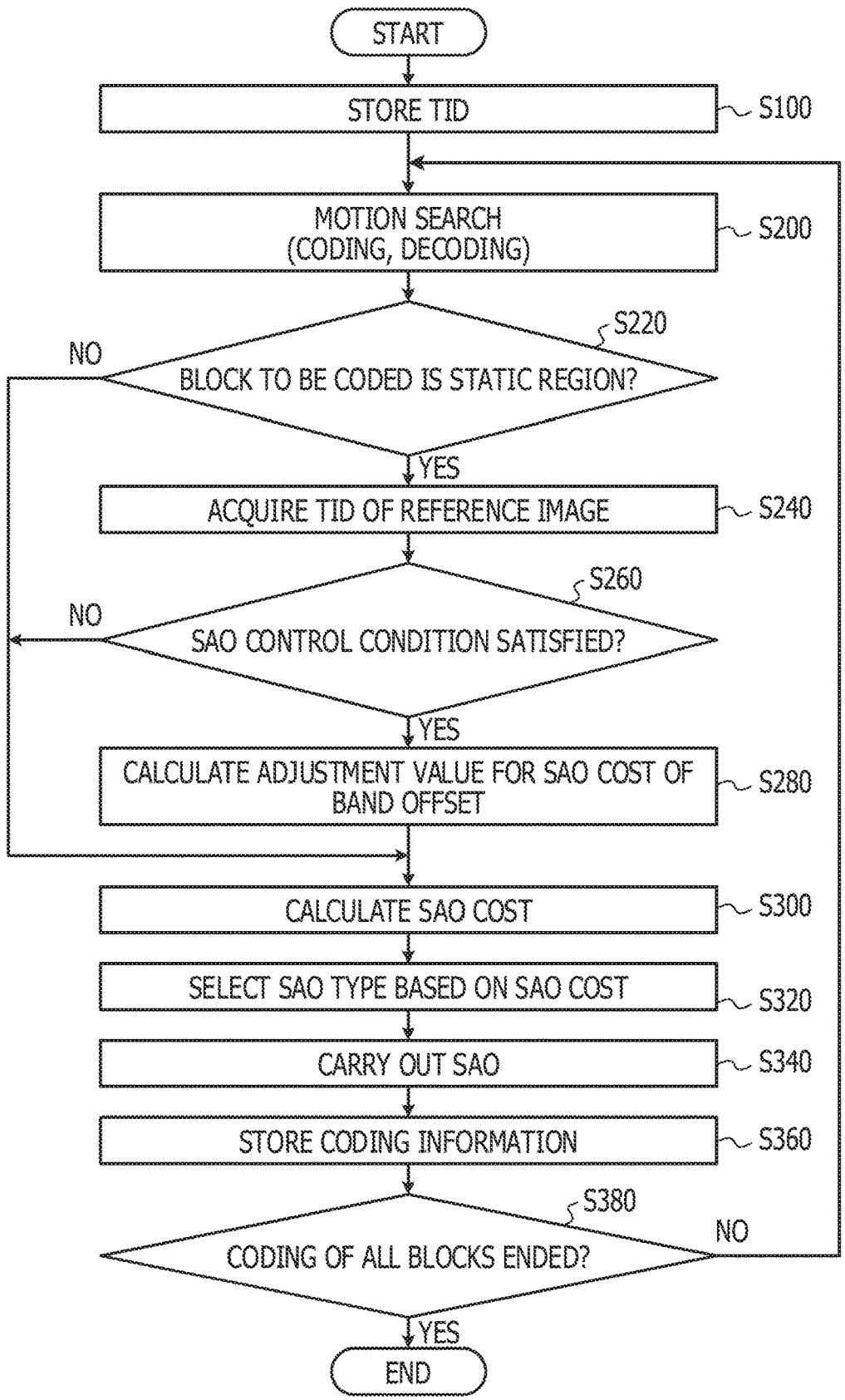

INFORMATION PROCESSING APPARATUS, INFORMATION PROCESSING METHOD, AND INFORMATION PROCESSING PROGRAM

CROSS-REFERENCE TO RELATED APPLICATION

This application is based upon and claims the benefit of priority of the prior Japanese Patent Application No. 2017-179066, filed on Sep. 19, 2017, the entire contents of which are incorporated herein by reference.

FIELD

The embodiments discussed herein are related to an information processing apparatus, an information processing method, and an information processing program.

BACKGROUND

An information processing apparatus codes moving images frame by frame, based on a moving image coding method in compliance with a coding standard such as H.264 or high efficiency video coding (HEVC). In HEVC, for instance, a temporal hierarchical structure hierarchized in a time direction, sample adaptive offset (SAO) filtering, and the like are employed. Hereinbelow, SAO may be referred to as adaptive offset filter. In the temporal hierarchical structure, when an image is coded with inter prediction (inter-frame prediction), an image in a layer that is the same as or shallower than a layer of the image to be coded is used as a reference image (see Japanese Laid-open Patent Publication No. 2016-146667, for instance). The adaptive offset filter adds an adaptively configured offset to a pixel value of a decoded image generated by decoding of a coded image (see Japanese Laid-open Patent Publication No. 2016-201824, for instance).

SUMMARY

According to an aspect of the embodiments, an apparatus includes a memory; and one or more processors that electronically communicate with the memory, wherein the one or more processors code each block in a frame of the moving images with use of a reference image, generate a decoded image by decoding of the coded block, calculate evaluation values to be referred to for selection of each of types of offset filtering that are first offset filtering in which offsets are added to particular pixel values, second offset filtering other than the first offset filtering among offset filtering in which offsets are added to pixel values, and third offset filtering in which no offset is added, determine whether the block to be coded is a static region, make an adjustment in the evaluation value on the first offset filtering, based on a layer position of the reference image in a time direction upon a determination that the block to be coded is the static region, and select any of the types of offset filtering based on the evaluation value on the first offset filtering having undergone the adjustment and the evaluation values on the second offset filtering and the third offset filtering and carry out the selected offset filtering for the decoded image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A is a diagram illustrating an embodiment of an information processing apparatus.

FIG. 2 is a diagram illustrating an example of operations of the information processing apparatus illustrated in FIG. 1A;

FIG. 6 is a diagram illustrating an example of operations of the information processing apparatus illustrated in FIG. 3.

DESCRIPTION OF EMBODIMENTS

Figure 1B:
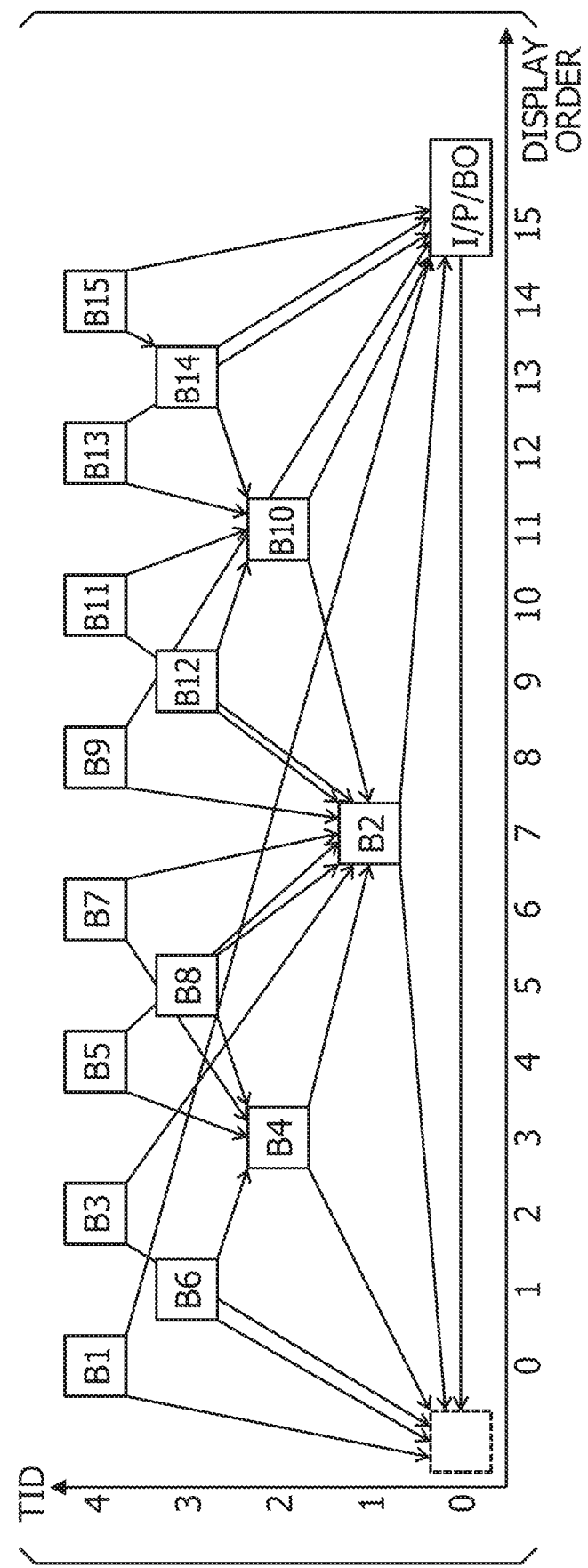
FIG. 1B is a diagram illustrating an embodiment of an information processing method and an information processing program.

The decoded image for which filtering has been carried out with use of the adaptive offset filter is referred to as a reference image when an image included in a layer that is deeper than the decoded image is coded with the inter prediction. In HEVC, the adaptive offset filter is selected from among a plurality of types of filters such as edge offset, band offset, and a type without addition of offset. The edge offset adds an offset to a value (pixel value) of a pixel to be processed, in accordance with differences in pixel value from pixels adjoining the pixel to be processed. The band offset partitions a range of pixel values into a plurality of compartments and adds offsets to pixel values that belong to particular successive four compartments (categories). In a case where pixel values in a block to be coded concentrate in successive four compartments, for instance, the band offset is prone to be selected in comparison with the edge offset or the like. The block to be coded is any of a plurality of blocks into which a frame of moving images to be coded is partitioned. In the band offset, offsets that reduce an error in the block to be coded are added to pixel values that belong to the particular successive four compartments, in accordance with a randomness of occurrence of errors caused by coding. For instance, offsets that make the pixel values having undergone the filtering approximate to an average value of the pixels in the block are added to the pixel values that belong to the particular successive four compartments.

In the temporal hierarchical structure, a predictive image for the block to be coded is generated based on a reference block that is a partial region of the reference image selected from decoded images, having undergone the filtering, in layers which are shallower than the layer of the block to be coded. In a case where the block to be coded is a static region such as a background, a block in the reference image that is in the same position as the block to be coded in the image to be coded is selected as the reference block. In this case, the block to be coded has a pattern that is the same as or similar to a pattern of the reference block. In a case where the block to be coded is a static region, therefore, a filter that is the same as the adaptive offset filter used for generation of the reference block is prone to be selected as the adaptive offset filter that is used for the filtering of the decoded image corresponding to the block to be coded. Provided that the reference block is generated by the filtering with use of the band offset, for instance, the band offset is prone to be selected, in comparison with the edge offset or the like, as the adaptive offset filter that is used for the filtering of the decoded image corresponding to the block to be coded. In a case where the block to be coded is a static region, therefore, the filtering with use of the band offset may be carried out for an image in the static region that is in the same position as the block to be coded, in each of a plurality of layers.

The filtering with use of the band offset is iteratively carried out for the image that is in the same position as the block to be coded, in the plurality of layers in the temporal hierarchical structure, and the values of the pixels in the block to be coded for which the coding, the decoding, and the filtering have been carried out are thereby averaged. Averaging of the values of the pixels in the block to be coded may cause disappearance of texture in the block to be coded and occurrence of block distortion in an image including the block to be coded. In this case, a quality of an image generated by decoding of the coded image is deteriorated in comparison with cases where the occurrence of the block distortion is reduced.

In one aspect, the embodiments discussed herein are intended for reducing deterioration in image quality that may be caused by iteration of the filtering with use of the band offset in the temporal hierarchical structure.

Hereinbelow, embodiments will be described with use of the drawings. In description below, image signals for display of images will not be particularly distinguished from the images themselves and may be referred to as "images".

FIGS. 1A and 1B illustrate an embodiment of an information processing apparatus, an information processing method, and an information processing program. The information processing apparatus 100 illustrated in FIG. 1A codes moving images frame by frame with hierarchizing of the moving images in a time direction in a moving image coding method in compliance with an HEVC standard, for instance. The information processing apparatus 100 may code moving images frame by frame with the hierarchizing of the moving images in the time direction in a moving image coding method in compliance with a coding standard other than HEVC.

An example of a temporal hierarchical structure is illustrated in tortoise shell brackets depicted on both sides in FIG. 1B. In the temporal hierarchical structure illustrated in FIG. 1B, a horizontal axis represents a display order for images and a vertical axis represents temporal ID (TID) that indicates a depth of a layer. A number indicated by the TID increases with the depth of the layer. The example illustrated in FIG. 1B represents the temporal hierarchical structure in 8K120 Hz coding specified in a standard STD-B32 of the Association of Radio Industries and Businesses (ARIB), and L indicating the depth of the layers is 4. In the ARIB standard STD-B32, the temporal hierarchical structure is employed in which reference images are arranged in a pyramidal shape for each set of pictures (SOP) that is a unit describing a coding order, a reference relationship, and the like in images, for instance.

Arrows depicted in the temporal hierarchical structure illustrated in FIG. 1B represent the reference relationship among the images in coding by inter prediction (inter-frame prediction). For instance, an image at an origin of an arrow is coded with use of an image at an end point of the arrow as a reference image. In the temporal hierarchical structure, as illustrated in FIG. 1B, an image in a layer that is the same as or shallower than a layer of an image to be coded is used as the reference image. Characters B written in rectangles in the temporal hierarchical structure each denote an image (B picture) that is coded with use of images ahead and behind as the reference images and a character P in the rectangle denotes an image (P picture) that is coded with use of an image ahead as the reference image. A character I written in the rectangle in the temporal hierarchical structure denotes an image (I picture) that is coded by intra prediction (intra-frame prediction). Numerals added after the characters B denote an order of the coding. For instance, the fifteenth image, counted from the zeroth image in the display order, among the sixteen images is any of the I picture, the P picture, and the B picture that has the TID of zero and is coded in the zeroth place. The zeroth image in the display order is the B picture that has the TID of M (M=6 in the ARIB standard STD-B32) and is coded in the first place counted from the zeroth. Hereinbelow, the zeroth image in the coding order may be referred to as the image B0, without particular distinction among the I picture, the P picture, and the B picture. A rectangle illustrated in FIG. 1B and made of dashed lines represents an image in an SOP that is coded before an SOP including the images B0 to B15 (images depicted by the rectangles of solid lines) is coded.

The information processing apparatus 100 may include a moving image coding apparatus or a processor such as a CPU, for instance. The information processing apparatus 100 includes a coding section 200, a decoding section 220, a static region determination section 300, an evaluation value calculation section 320, an adjustment section 340, and a filter execution section 360, for instance. The coding section 200, the decoding section 220, the static region determination section 300, the evaluation value calculation section 320, the adjustment section 340, and the filter execution section 360 may be implemented by processors (made of digital signal processors (DSP) and/or field programmable gate arrays (FPGA) or the like, for instance) and the processors may be implemented by software control. For instance, the decoding section 220, the static region determination section 300, the evaluation value calculation section 320, the adjustment section 340, and the filter execution section 360 may be implemented by execution of information processing programs by the processors included in the information processing apparatus 100. The information processing programs may be stored in a storage device such as a memory in the information processing apparatus 100 or may be stored in a storage device outside of the information processing apparatus 100. The information processing programs may be stored on a recording medium 201, such as a compact disc read only memory (CD-ROM), a digital versatile disc (DVD), or a universal serial bus (USB) memory, which is readable by the information processing apparatus 100. In this configuration, the information processing programs stored in the recording medium 201 are transferred from the recording medium 201 through an input-output interface provided in the information processing apparatus 100 to a memory or the like. The information processing programs may be transferred from the recording medium 201 to a hard disc and may be thereafter transferred from the hard disc to the memory.

The coding section 200 codes each block in a frame of moving images with use of the reference image. For instance, the coding section 200 receives blocks to be coded among a plurality of blocks into which blocks in an image (a frame of the moving images) to be coded has been partitioned, from an overall control section that controls overall operations in the coding of moving images. The images to be coded are selected by the overall control section in the coding order (order of the numerals added behind the characters B illustrated in FIG. 1B) based on the temporal hierarchical structure, for instance. The coding section 200 selects the reference image for the block to be coded based on the temporal hierarchical structure and carries out the inter prediction with use of the selected reference image. Thus a predictive image for the block to be coded is generated. In the inter prediction, a block that is most similar to the block to be coded is extracted, as a reference block that is a partial region of the reference image, from the reference image and the predictive image is generated with use of the reference block extracted from the reference image. The coding section 200 may generate the predictive image for the block to be coded by carrying out the intra prediction. The coding section 200 calculates a predictive error image indicating a difference between the block to be coded and the predictive image and carries out orthogonal transformation of the predictive error image. Furthermore, the coding section 200 quantizes the predictive error image having undergone the orthogonal transformation and outputs the quantized predictive error image to the decoding section 220. The coding section 200 carries out entropy coding of the quantized predictive error image and outputs the resultant predictive error image to a moving image decoding apparatus or the like. The quantized predictive error image is an example of the coded block.

The decoding section 220 decodes the quantized predictive error image (coded block) received from the coding section 200 and thereby generates the decoded image. For instance, the decoding section 220 carries out inverse quantization of the quantized predictive error image and carries out inverse orthogonal transformation of the predictive error image having undergone the inverse quantization. Thus the predictive error image is decoded. The decoding section 220 generates the decoded image by addition of the decoded predictive error image and the predictive image generated in the coding section 200 and outputs the decoded image to the evaluation value calculation section 320.

The static region determination section 300 receives the block to be coded that is transferred to the coding section 200 and determines whether the block to be coded is a static region such as a background or not. In a case where a sum of values (absolute values) of pixels of the predictive error image generated in the coding section 200 is equal to or smaller than a specified value, for instance, the static region determination section 300 determines that the block to be coded is the static region. Then the static region determination section 300 outputs information, indicating a result of a determination as to whether the block to be coded is the static region or not, to the adjustment section 340. The sum of the values (absolute values) of the pixels of the predictive error image is an example of the cost calculated based on the difference between the predictive image generated from the reference image and the block to be coded.

A method of the determination on the static region is not limited to a method with use of the predictive error image. For instance, the static region determination section 300 may determine that the block to be coded is the static region in a case where magnitude of a motion vector calculated in generation of the predictive image by the inter prediction is equal to or smaller than a specified value. The motion vector represents information for estimation of an amount of motion of an image and is calculated for each block to be coded, for instance.

The evaluation value calculation section 320 receives the block to be coded that is transferred to the coding section 200 and receives the decoded image decoded from the decoding section 220. The evaluation value calculation section 320 calculates evaluation values that are referred to for selection of each of a plurality of types of offset filtering such as offset filtering in which offsets are added to pixel values and offset filtering in which no offset is added to pixel values. The offset filtering in which offsets are added to pixel values is filtering with use of the band offset, filtering with use of the edge offset, or the like, for instance.

As the types of the offset filtering in HEVC, three SAO types that are the band offset, the edge offset, and the type in which no offset is added to pixel values are defined, for instance. In the band offset, a range of the pixel values is partitioned into a plurality of compartments and offsets are added to pixel values that belong to particular successive four compartments. In the edge offset, an offset is added to a value (pixel value) of a pixel to be processed, in accordance with differences in pixel values from pixels adjoining the pixel to be processed. Details of the band offset and the edge offset will be described with reference to FIG. 5.

The filtering with use of the band offset is an example of the first offset filtering and the filtering with use of the edge offset is an example of the second offset filtering. The offset filtering in which no offset is added to pixel values is an example of the third offset filtering. The evaluation value on the filtering with use of the band offset may be referred to as the evaluation value on the band offset or SAO cost of the band offset below. The evaluation value on the filtering with use of the edge offset may be referred to as the evaluation value on the edge offset or SAO cost of the edge offset.

The evaluation value calculation section 320 calculates the evaluation value on each type of the offset filtering based on an error or the like between the decoded image obtained through execution of the type of the offset filtering and the block to be coded that is an original image of the decoded image, for instance. The evaluation value calculation section 320 outputs the evaluation value on the band offset among the evaluation values on the plurality of types of offset filtering to the adjustment section 340 and outputs the evaluation values on the remaining types of offset filtering to the filter execution section 360. The evaluation value calculation section 320 may transfer the evaluation values on the remaining types of offset filtering through the adjustment section 340 to the filter execution section 360.

The adjustment section 340 acquires TID of the reference image that is used for the coding of the block to be coded, from the overall control section, and identifies a layer position (depth of layer) of the reference image in the time direction, for instance. The adjustment section 340 adjusts the evaluation value on the band offset in such a direction that selection of the band offset may be reduced, based on the result of the determination as to whether the block to be coded is the static region or not and the TID (layer position in the time direction) of the reference image. In a case where the offset filtering having the lowest evaluation value among the plurality of types of offset filtering is selected by the filter execution section 360, for instance, the direction such that the selection of the band offset may be reduced is a direction such that the evaluation value on the band offset is increased. In a case where the block to be coded is the static region, for instance, the adjustment section 340 adjusts the evaluation value on the band offset by adding a product of the TID of the reference image and a specified constant to the evaluation value on the band offset calculated by the evaluation value calculation section 320. The adjustment section 340 outputs the evaluation value having undergone the adjustment for the band offset to the filter execution section 360.

Thus the adjustment section 340 adjusts the evaluation value on the band offset based on the layer position (TID) of the reference image in the time direction in a case where the static region determination section 300 determines that the block to be coded is the static region. In a case where the block to be coded is not the static region, the adjustment section 340 may output the evaluation value on the band offset, calculated by the evaluation value calculation section 320, to the filter execution section 360 without the adjustment.

The filter execution section 360 selects any of the plurality of types of offset filtering based on the evaluation value having undergone the adjustment for the band offset, the evaluation value on the edge offset, and the evaluation value with addition of no offset to the pixel values. The filter execution section 360 carries out the offset filtering, selected based on the evaluation values, for the decoded image. The decoded image for which the offset filtering has been carried out may be used as the reference image in the coding of subsequent images and is stored in the memory.

In the temporal hierarchical structure illustrated in FIG. 1B, a predictive image for each of the images B1 to B15 is generated with use of the reference block selected from the reference image included in a layer that is shallower than the block to be coded. In a case where the block to be coded is the static region, for instance, a block that is in the same position as the block to be coded is selected as the reference block that is used for generation of the predictive image, from the decoded image, having undergone the filtering, in a layer that is shallower than the block to be coded. In this case, the block to be coded has a pattern that is the same as or similar to the reference block and thus there is a fear that the filtering with use of the band offset may be carried out a number of times that is the same as the number of the layers. For instance, a first block, among a plurality of blocks in the image B14, that is in the same position as a first block of the image B15 is selected as the reference block for the first block, among a plurality of blocks in the image B15. A first block, among a plurality of blocks in the image B10, which is in the same position as the first block of the image B14 is selected as the reference block for the first block in the image B14. A first block, among a plurality of blocks in the image B2, which is in the same position as the first block of the image B10 is selected as the reference block for the first block in the image B10. A first block, among a plurality of blocks in the image B0, which is in the same position as the first block of the image B2 is selected as the reference block for the first block in the image B2. A first block, among a plurality of blocks in the image (the rectangle of the dashed lines illustrated in FIG. 1B) in the set of pictures (SOP) that are coded before the SOP including the images B0 to B15 are coded, that is in the same position as the first block of the image B0 is selected as the reference block for the first block in the image B0. In this example, the filtering with use of the band offset is carried out five times for the first block of the image B15.

The band offset tends to average the values of the pixels in a block. In a case where the filtering with use of the band offset is iteratively carried out for a block in the static region, therefore, a texture in the block may disappear and block distortion may occur in an image including the block in the static region. That is, without the adjustment in the evaluation value on the band offset, there is a fear that iterative execution of the filtering with use of the band offset for a block in the static region may result in occurrence of the block distortion in an image including the block in the static region. In a case where the block to be coded is the static region, therefore, the information processing apparatus 100 adjusts the evaluation value on the band offset in the direction such that the selection of the band offset may be reduced. Thus the information processing apparatus 100 is capable of reducing the iterative execution of the filtering with use of the band offset for the block in the static region and reducing the occurrence of the block distortion. As a result, the information processing apparatus 100 is capable of improving the quality of the image generated by the decoding of the coded image in comparison with coding methods without the adjustment in the evaluation value on the band offset.

FIG. 2 illustrates an example of operations of the information processing apparatus 100 illustrated in FIG. 1A. The operations illustrated in FIG. 2 represent an example of the information processing method. A program that causes the information processing apparatus 100 such as a computer to execute the operations illustrated in FIG. 2 is an example of the information processing program. The operations illustrated in FIG. 2 are carried out for each block to be coded.

In step S10, the coding section 200 codes the block to be coded, as described with reference to FIG. 1A. The block coded in step S10 is outputted to the moving image decoding apparatus or the like after undergoing the entropy coding, as well as being used in step S20 that will be described later.

In step S20, the decoding section 220 decodes the block coded in step S10. The decoded image of the coded block is generated by the decoding process of the decoding section 220 for the coded block because the decoded image is prepared as the reference image in the coding of subsequent images.

In step S30, the evaluation value calculation section 320 calculates the evaluation values on the offset filtering type by type for the block to be coded.

In step S40, the static region determination section 300 determines whether the block to be coded is the static region or not. In a case where the block to be coded is the static region, the operations of the information processing apparatus 100 proceed to step S50. On the other hand, in a case where the block to be coded is not the static region, the operations of the information processing apparatus 100 proceed to step S60.

In step S50, the adjustment section 340 adjusts the evaluation value on the band offset that is one of the evaluation values on the plurality of types of offset filtering calculated in step S30, based on the layer position of the reference image in the time direction. For instance, the adjustment section 340 adjusts the evaluation value on the band offset in the direction such that the selection of the band offset may be reduced, based on the layer position of the reference image in the time direction. Thus the iterative execution of the filtering with use of the band offset for the block in the static region may be reduced, as described with reference to FIG. 1A. After processing of step S50 is carried out, the operations of the information processing apparatus 100 proceed to step S60.

In step S60, the filter execution section 360 selects any of the plurality of types of offset filtering based on the evaluation values. In a case where the block to be coded is not the static region, for instance, the filter execution section 360 makes a comparison among the evaluation values calculated in step S30 on the plurality of types of offset filtering and selects the offset filtering that exhibits the lowest evaluation value. In a case where the block to be coded is the static region, for instance, the filter execution section 360 refers to the evaluation value having undergone the adjustment in step S50, instead of the evaluation value calculated in step S30, as the evaluation value on the band offset.

In step S70, the filter execution section 360 carries out the offset filtering, selected in step S60, for the decoded image generated in step S20. The decoded image for which the offset filtering has been carried out may be used as the reference image in the coding of subsequent images and is stored in the memory. At an end of processing of step S70, a series of processing in the coding of the block to be coded is ended.

The operations of the information processing apparatus 100 are not limited to the example illustrated in FIG. 2. For instance, the information processing apparatus 100 may carry out the determination of step S40 prior to step S30 and, in a case where the block to be coded is the static region, may carry out both the calculation of and the adjustment in the evaluation value on the band offset together.

In a case where the block to be coded is the static region, in the above embodiment illustrated in FIGS. 1A, 1B, and 2, the information processing apparatus 100 adjusts the evaluation value on the band offset that is one of the evaluation values on the plurality of types of offset filtering, based on the layer position of the reference image in the time direction. Thus the evaluation value on the band offset is adjusted in the direction such that the selection of the band offset may be reduced, in a case where the block to be coded is the static region. As a result, the iterative execution of the filtering with use of the band offset for the block in the static region may be reduced so that the occurrence of the block distortion may be reduced. Thus the deterioration in the image quality that may be caused by the iteration of the filtering with use of the band offset in the temporal hierarchical structure may be reduced.

Figure 3:
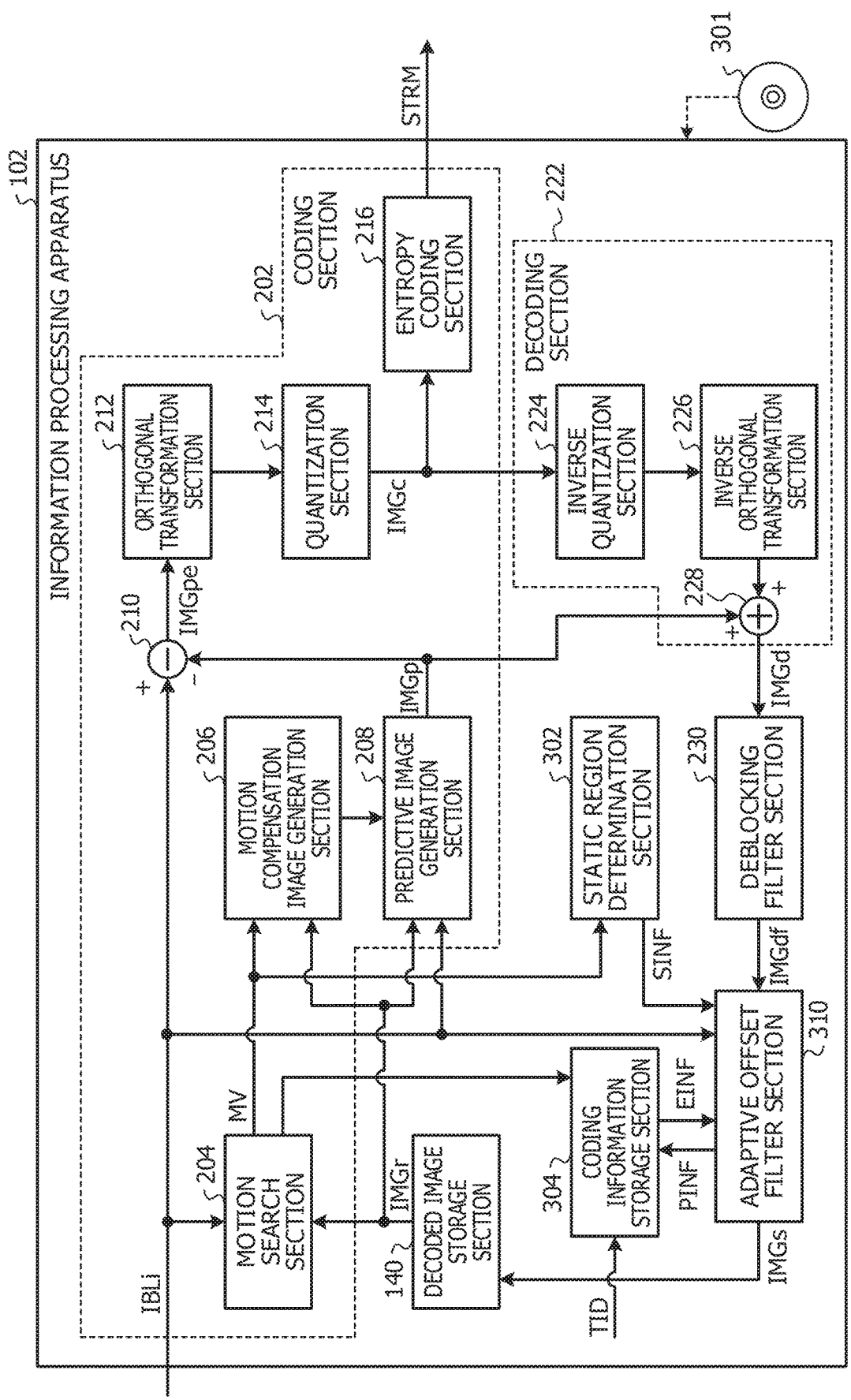
FIG. 3 is a diagram illustrating another embodiment of an information processing apparatus, an information processing method, and an information processing program.

FIG. 3 illustrates another embodiment of an information processing apparatus, an information processing method, and an information processing program. Elements that are the same as or similar to elements described with reference to FIGS. 1A to 2 are provided with the same or similar characters and detailed description on the elements is omitted. The information processing apparatus 102 illustrated in FIG. 3 may include a moving image coding apparatus or a processor such as a CPU, for instance. Moving images are coded frame by frame with the hierarchizing of the moving images in the time direction in a moving image coding method in compliance with the HEVC standard. The information processing apparatus 102 may code moving images frame by frame with the hierarchizing of the moving images in the time direction in a moving image coding method in compliance with a coding standard other than HEVC.

Figure 4:
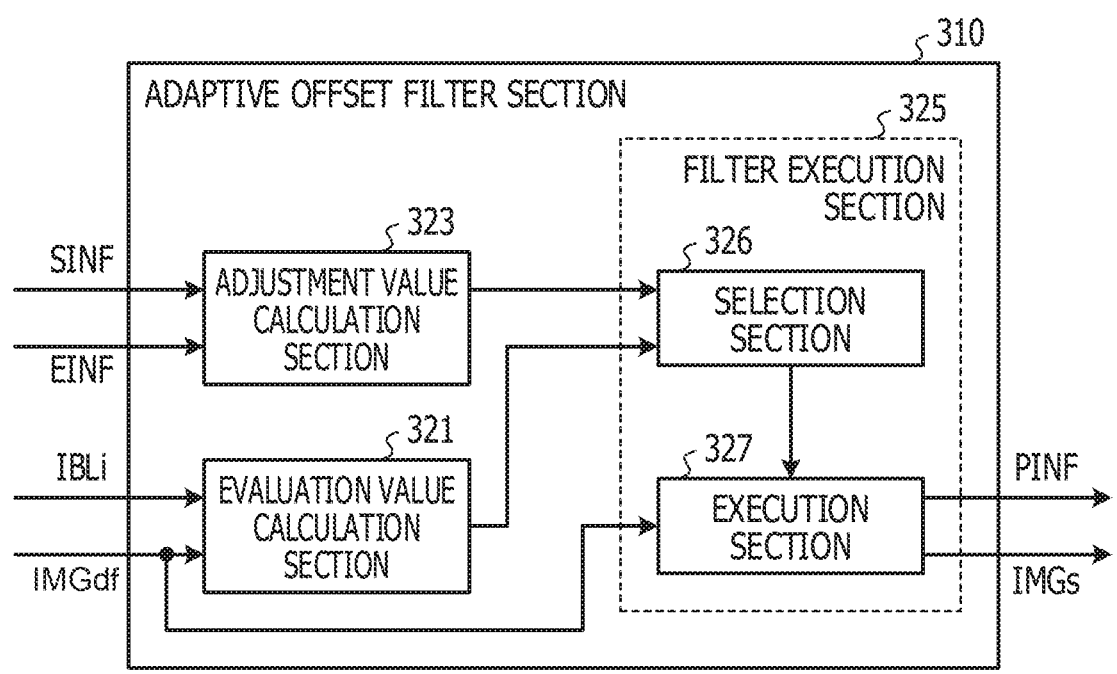
FIG. 4 is a diagram illustrating an example of an adaptive offset filter section illustrated in FIG. 3.

The information processing apparatus 102 includes a coding section 202, a decoding section 222, a static region determination section 302, in place of the coding section 200, the decoding section 220, and the static region determination section 300 that are illustrated in FIG. 1A. The information processing apparatus 102 further includes an adaptive offset filter section 310 including an evaluation value calculation section 321, an adjustment value calculation section 323, and a filter execution section 325 that are illustrated in FIG. 4, in place of the evaluation value calculation section 320, the adjustment section 340, and the filter execution section 360 that are illustrated in FIG. 1A. In the information processing apparatus 102, a decoded image storage section 140, a deblocking filter section 230, and a coding information storage section 304 are added to the information processing apparatus 100 illustrated in FIG. 1A. Other configurations of the information processing apparatus 102 are the same as or similar to configurations of the information processing apparatus 100 illustrated in FIG. 1A.

The information processing apparatus 102 includes the decoded image storage section 140 that retains an image to be used as a reference image IMGr, the coding section 202, the decoding section 222, the deblocking filter section 230, the static region determination section 302, and the coding information storage section 304, for instance. The information processing apparatus 102 further includes the adaptive offset filter section 310. The coding section 202, the decoding section 222, the deblocking filter section 230, the static region determination section 302, and the adaptive offset filter section 310 may be implemented by processors (made of digital signal processors (DSP) and/or field programmable gate arrays (FPGA) or the like, for instance) and the processors may be implemented by control by software. For instance, the coding section 202, the decoding section 222, the deblocking filter section 230, the static region determination section 302, and the adaptive offset filter section 310 may be implemented by execution of information processing programs by the processors included in the information processing apparatus 102. The information processing programs may be stored in a storage device such as a memory in the information processing apparatus 102 or may be stored in a storage device outside of the information processing apparatus 102. The information processing programs may be stored in the recording medium 301, such as the CD-ROM, the DVD, or the USB memory, which is readable by the information processing apparatus 102. In this configuration, the information processing programs stored in the recording medium 301 are transferred from the recording medium 301 through an input-output interface provided in the information processing apparatus 102 to a memory or the like. The information processing programs may be transferred from the recording medium 301 to a hard disc and may be thereafter transferred from the hard disc to the memory.

Operations of the coding section 202 may be the same as or similar to operations of the coding section 200 illustrated in FIG. 1A. For instance, the coding section 202 includes a motion search section 204, a motion compensation image generation section 206, a predictive image generation section 208, a difference calculation section 210, an orthogonal transformation section 212, a quantization section 214, and an entropy coding section 216.

The motion search section 204 receives a block IBLi to be coded among a plurality of blocks into which an image (a frame of moving images) to be coded has been partitioned, from the overall control section that controls the overall operations in the coding of moving images, for instance. The overall control section selects a frame to be coded among frames of moving images in the coding order based on the temporal hierarchical structure, for instance. The overall control section partitions the frame to be coded into a plurality of blocks and sequentially transfers each of the plurality of blocks in the frame to be coded, as the block IBLi to be coded, to the motion search section 204. The block IBLi to be coded is transferred to the predictive image generation section 208, the difference calculation section 210, and the adaptive offset filter section 310, in addition to the motion search section 204.

The motion search section 204 receives the reference image IMGr for the block IBLi to be coded, from the decoded image storage section 140. For instance, the motion search section 204 receives the reference image IMGr that is selected based on the temporal hierarchical structure, from the decoded image storage section 140. Then the motion search section 204 transfers a motion vector MV calculated through a comparison between the block IBLi to be coded and the reference image IMGr, to the motion compensation image generation section 206, the static region determination section 302, and the like. The motion search section 204 searches the reference image IMGr to detect a block that is most similar to the block IBLi to be coded, as the reference block, and calculates the motion vector MV that indicates a position of the reference block, for instance.

The motion compensation image generation section 206 receives the motion vector MV from the motion search section 204 and receives the reference image IMGr that is used for calculation of the motion vector MV by the motion search section 204, from the decoded image storage section 140, for instance. The motion compensation image generation section 206 carries out motion compensation processing based on the reference image IMGr and the motion vector MV and generates a motion compensation image. The motion compensation image is a predictive image that is generated by the inter prediction. The motion compensation image may be referred to as the predictive image with the inter prediction, hereinbelow. The motion compensation image generation section 206 transfers the predictive image with the inter prediction to the predictive image generation section 208.

The predictive image generation section 208 selects either of the predictive image with the inter prediction and a predictive image with the intra prediction, as a predictive image IMGp for the block IBLi to be coded, and transfers the predictive image IMGp to the difference calculation section 210 and an addition section 228 of the decoding section 222 that will be described later, for instance.

The predictive image generation section 208 carries out the intra prediction with use of the reference image IMGr received from the decoded image storage section 140 and the block IBLi to be coded received from the overall control section and thereby generates the predictive image with the intra prediction, for instance. In the intra prediction, the reference image IMGr is an image including pixels adjoining the block IBLi to be coded, among pixels of a local decoded image IMGd that is generated by decoding of a coded block adjoining the block IBLi to be coded.

The predictive image generation section 208 calculates a sum of absolute values of differences in values of corresponding pixels between the predictive image with the inter prediction and the block to be coded, as a cost of the inter prediction. The predictive image generation section 208 further calculates a sum of absolute values of differences in values of corresponding pixels between the predictive image with the intra prediction and the block to be coded, as a cost of the intra prediction. The predictive image generation section 208 makes a comparison between the cost of the inter prediction and the cost of the intra prediction and selects the predictive image having the lower cost as the predictive image IMGp for the block IBLi to be coded.

The difference calculation section 210 calculates a difference between the block IBLi to be coded and the predictive image IMGp. Thus a predictive error image IMGpe that indicates the difference between the block IBLi to be coded and the predictive image IMGp is generated. The difference calculation section 210 outputs the predictive error image IMGpe to the orthogonal transformation section 212.

The orthogonal transformation section 212 carries out orthogonal transformation of the predictive error image IMGpe received from the difference calculation section 210 and outputs the resultant predictive error image IMGpe to the quantization section 214. By the orthogonal transformation, discrete signals are converted into frequency domain signals. The quantization section 214 quantizes data received from the orthogonal transformation section 212. The data IMGc quantized by the quantization section 214 is transferred to an inverse quantization section 224, which will be described later, of the decoding section 222 and to the entropy coding section 216. The quantized data IMGc (predictive error image for which the orthogonal transformation and the quantization have been carried out) is an example of the coded block.

The entropy coding section 216 carries out entropy coding for the data IMGc received from the quantization section 214 and thereby generates a bit stream STRM (coded image). The entropy coding section 216 outputs the bit stream STRM to the moving image decoding apparatus or the like.

Operations of the decoding section 222 may be the same as or similar to operations of the decoding section 220 illustrated in FIG. 1A. The decoding section 222 includes the inverse quantization section 224, an inverse orthogonal transformation section 226, and the addition section 228, for instance. The inverse quantization section 224 carries out the inverse quantization for the data IMGc (coded block) received from the quantization section 214 and outputs the resultant data IMGc to the inverse orthogonal transformation section 226. The inverse orthogonal transformation section 226 carries out inverse orthogonal transformation for the data received from the inverse quantization section 224 and outputs the resultant data to the addition section 228. The addition section 228 generates the local decoded image IMGd by addition of the data received from the inverse orthogonal transformation section 226 and the predictive image IMGp received from the predictive image generation section 208. The addition section 228 outputs the local decoded image IMGd to the deblocking filter section 230. The local decoded image IMGd is used as the reference image for the intra prediction and is therefore stored in the decoded image storage section 140.

The deblocking filter section 230 carries out deblocking filtering for smoothing block boundaries, for the local decoded image IMGd received from the addition section 228, for instance. Thus a decoded image IMGdf is generated. The deblocking filter section 230 outputs the decoded image IMGdf to the adaptive offset filter section 310.

The static region determination section 302 may be the same as or similar to the static region determination section 300 illustrated in FIG. 1A. The static region determination section 302 receives the motion vector MV that is transferred to the motion compensation image generation section 206, from the motion search section 204, for instance. The static region determination section 302 determines whether the block IBLi to be coded is the static region or not, based on the motion vector MV received from the motion search section 204. For instance, the static region determination section 302 determines that the block IBLi to be coded is the static region in a case where magnitude of the motion vector MV is equal to or smaller than a specified value. That is, the static region determination section 302 determines that the block IBLi to be coded is the static region in a case where expression (1) that is expressed with use of the motion vector MV (mvx, mvy) and a predetermined threshold Sth considered as the static region is satisfied. A sign "^" in expression (1) represents exponentiation.

$$\sqrt{(mvx\char`\^2+mvy\char`\^2)} \leq Sth \qquad (1)$$

A conditional expression for the determination as to whether the magnitude of the motion vector MV is equal to or smaller than the specified value or not is not limited to expression (1). The method of the determination on the static region is not limited to a method with use of the motion vector MV. For instance, the static region determination section 302 may be provided with the cost of the inter prediction and the like from the predictive image generation section 208 and may determine that the block IBLi to be coded is the static region in a case where the cost provided by the predictive image generation section 208 is equal to or smaller than a specified value. In this case, the cost of the inter prediction and the cost of the intra prediction that are calculated by the predictive image generation section 208 are an example of the costs that are calculated based on the difference between the predictive image generated from the reference image and the block to be coded.

The coding information storage section 304 receives the TID indicating the depth of the layer in the temporal hierarchical structure of the reference image IMGr that is used in the coding of the block IBLi to be coded by the inter prediction, from the overall control section, and retains the TID of the reference image IMGr. The coding information storage section 304 receives prediction mode information that indicates a mode of the inter prediction or the like in the coding of the block IBLi to be coded by the inter prediction, from the motion search section 204. The coding information storage section 304 retains the prediction mode information received from the motion search section 204. The mode of the inter prediction is a bidirectional prediction mode, a skip mode in which the predictive image IMGp is coded without generation of the predictive error image IMGpe, or the like, for instance. The coding information storage section 304 receives type information PINF that indicates a type of the offset filtering selected by the adaptive offset filter section 310. The coding information storage section 304 retains the type information PINF received from the adaptive offset filter section 310. The TID, the prediction mode information, the type information PINF, and the like that are retained in the coding information storage section 304 are transferred as coding information EINF to the adaptive offset filter section 310, for instance.

The adaptive offset filter section 310 receives the block IBLi to be coded, from the overall control section, and receives the decoded image IMGdf from the deblocking filter section 230. The adaptive offset filter section 310 receives staticity information SINF, indicating the result of the determination as to whether the block IBLi to be coded is the static region or not, from the static region determination section 302 and receives the coding information EINF on the reference image IMGr from the coding information storage section 304. The adaptive offset filter section 310 carries out any of the plurality of types of offset filtering for the decoded image IMGdf, based on the staticity information SINF and the coding information EINF.

The adaptive offset filter section 310 extracts features of coding errors in the decoded image IMGdf and calculates an offset for each of the extracted features, for instance. The adaptive offset filter section 310 adds the offset, calculated for each of the features of the coding errors in the decoded image IMGdf, to the decoded image IMGdf. Thus the coding errors in the decoded image IMGdf are reduced.

As described with reference to FIG. 1A, the plurality of types of offset filtering are the offset filtering in which offsets are added to the pixel values, the offset filtering in which no offset is added to the pixel values, and the like. The adaptive offset filter section 310 stores a decoded image IMGs, generated by execution of any of the plurality of types of offset filtering for the decoded image IMGdf, in the decoded image storage section 140. The decoded image IMGs retained in the decoded image storage section 140 is used as the reference image for the inter prediction. The adaptive offset filter section 310 stores the type information PINF, indicating the type of the offset filtering carried out for the decoded image IMGdf, in the coding information storage section 304. Details of the adaptive offset filter section 310 will be described with reference to FIG. 4.

Configurations of the information processing apparatus 102 are not limited to the example illustrated in FIG. 3. The information processing apparatus 102 may carry out adaptive loop filtering for the decoded image IMGs having undergone the offset filtering, for instance. In this case, the decoded image IMGs for which the adaptive loop filtering has been carried out is stored in the decoded image storage section 140 and is used as the reference image IMGr. The coding section 202 may be defined with exclusion of the entropy coding section 216, for instance. The decoding section 222 may be defined with inclusion of the deblocking filter section 230, for instance.

FIG. 4 illustrates an example of the adaptive offset filter section 310 illustrated in FIG. 3. With reference to FIG. 4, operations of the adaptive offset filter section 310 will be described with use of an example in which a sample adaptive offset (SAO) type exhibiting the lowest SAO cost among a plurality of SAO types is selected as the offset filtering to be carried out for the decoded image IMGdf. Hereinbelow, execution of the offset filtering with use of any of the plurality of SAO types may be simply referred to as execution of SAO.

The adaptive offset filter section 310 includes the evaluation value calculation section 321, the adjustment value calculation section 323, and the filter execution section 325. The filter execution section 325 includes a selection section 326 and an execution section 327.

The evaluation value calculation section 321 is the same as or similar to the evaluation value calculation section 320 illustrated in FIG. 1A. The evaluation value calculation section 321 receives the block IBLi to be coded and the decoded image IMGdf having undergone the deblocking filtering, for instance. The evaluation value calculation section 321 calculates the SAO cost of the band offset, the SAO cost of the edge offset, and an SAO cost without addition of offset to the pixel values, based on the block IBLi to be coded and the decoded image IMGdf. The SAO cost without addition of offset to the pixel values may be referred to as the SAO cost with no offset, hereinbelow.

The SAO cost of each of the three SAO types is represented by expression (2) with use of SAOCost(Type). Characters "Type" in expression (2) represent the SAO type (band offset, edge offset, or no offset). Hereinbelow, SAOCost(BO) represents the SAO cost of the band offset, SAOCost(EO) represents the SAO cost of the edge offset, and SAOCost(None) represents the SAO cost without addition of offset to the pixel values, for instance.

$$SAOCost(Type)=DIST+\lambda*BitCost \qquad (2)$$

A sign "*" in expression (2) represents multiplication. Characters "DIST" represent a sum of squares of errors in pixels between the block IBLi to be coded and an image with supposed execution of SAO for the decoded image IMGdf. In SAOCost(None), the characters "DIST" represent the sum of squares of the errors in pixels between the block IBLi to be coded and the decoded image IMGdf. Characters "BitCost" represent a bit quantity with coding of SAO syntax. A sign "λ" represents a predetermined balance adjustment constant.

The evaluation value calculation section 321 transfers the SAO cost (SAOCost(BO)) of the band offset, the SAO cost (SAOCost(EO)) of the edge offset, and the SAO cost (SAOCost(None)) with no offset to the selection section 326.

The adjustment value calculation section 323 receives the coding information EINF including the TID of the reference image IMGr and the like and the staticity information SINF indicating the result of the determination as to whether the block IBLi to be coded is the static region or not. In a case where the block IBLi to be coded is the static region, the adjustment value calculation section 323 calculates an adjustment value to be added to the SAO cost of the band offset calculated by the evaluation value calculation section 321 and transfers the calculated adjustment value to the selection section 326. The adjustment value SAOAdj in a case where the block IBLi to be coded is the static region may be represented by expression (3), for instance.

$$SAOAdj = TIDmax * k \quad (3)$$

Characters "TIDmax" in expression (3) represent the greater TID of TIDs of the two reference images IMGr that are referred to in bidirectional prediction and a character "k" represents a predetermined constant. In expression (3), the deeper the layer of the reference image IMGr is (the greater the TID is), the greater the adjustment value SAOAdj is. A method of calculating the adjustment value SAOAdj is not limited to expression (3).

In a case where the block IBLi to be coded is not the static region, the adjustment value calculation section 323 outputs the adjustment value of zero to the selection section 326. The SAO cost of the band offset is adjusted with use of the adjustment value calculated by the adjustment value calculation section 323. The adjustment value calculation section 323 is an example of the adjustment section that adjusts the evaluation value on the band offset (first offset filtering).

Operations of the filter execution section 325 may be the same as or similar to operations of the filter execution section 360 illustrated in FIG. 1A. The selection section 326 of the filter execution section 325 adds the adjustment value SAOAdj, received from the adjustment value calculation section 323, to the SAO cost of the band offset received from the evaluation value calculation section 321. Thus the SAO cost having undergone the adjustment for the band offset is calculated. The SAO cost (SAOCost(BO)) having undergone the adjustment for the band offset may be represented by expression (4).

$$SAOCost(BO) = DIST + \lambda * BitCost + SAOAdj \quad (4)$$

The selection section 326 selects the SAO type that exhibits the lowest SAO cost among the SAO cost, having undergone the adjustment for the band offset, calculated with use of expression (4), and the SAO cost of the edge offset and the SAO cost with no offset that are received from the evaluation value calculation section 321. Thus the offset filtering to be carried out for the decoded image IMGdf is determined. The selection section 326 outputs the type information PINF, indicating the SAO type selected based on the SAO cost from among the plurality of SAO types, to the execution section 327. The execution section 327 carries out the offset filtering of the SAO type selected by the selection section 326, for the decoded image IMGdf. Thus the decoded image IMGs is generated. The execution section 327 outputs the decoded image IMGs to the decoded image storage section 140 and outputs the type information PINF, indicating the SAO type selected by the selection section 326, to the coding information storage section 304.

In a case where the static region determination section 302 determines that the block IBLi to be coded is the static region, as described above, the adjustment value calculation section 323 adjusts the evaluation value on the band offset in the direction such that the selection of the band offset may be reduced, based on the TID of the reference image. The deeper the layer of the reference image IMGr is (the greater the TID is), the further the evaluation value (SAO cost) on the band offset is adjusted in the direction such that the selection of the band offset may be reduced, for instance. Thus the adaptive offset filter section 310 is capable of reducing the iterative execution of the filtering with use of the band offset for the block in the static region and thereby reducing the occurrence of the block distortion.

Configurations of the adaptive offset filter section 310 are not limited to the example illustrated in FIG. 4. In a case where the static region determination section 302 determines that the block IBLi to be coded is not the static region, for instance, the adjustment value calculation section 323 may omit processing of setting the adjustment value at zero. In this case, the selection section 326 receives the staticity information SINF, for instance. The type information PINF may be outputted from the selection section 326 to the coding information storage section 304.

In a case where the static region determination section 302 determines that the block IBLi to be coded is the static region, the adjustment value calculation section 323 may acquire type information PID indicating the type (SAO type) of the offset filtering carried out for the reference image IMGr. The adjustment value calculation section 323 may adjust the evaluation value (SAO cost) on the band offset based on the type information PINF on and the layer position (TID) of the reference image IMGr. In a case where the SAO type for the reference image IMGr is the band offset, for instance, the adjustment value calculation section 323 may make the adjustment value SAOAdj greater than the adjustment values SAOAdj in a cases where the SAO type for the reference image IMGr is other than the band offset.

In a case where the static region determination section 302 determines that the block IBLi to be coded is the static region, the adjustment value calculation section 323 may acquire the prediction mode information indicating the prediction mode of the inter prediction used for the coding of the block IBLi to be coded. The adjustment value calculation section 323 may adjust the evaluation value (SAO cost) on the band offset based on the prediction mode information on the block IBLi to be coded and the layer position (TID) of the reference image IMGr. In a case where the prediction mode information indicates the bidirectional prediction mode in which the two reference images IMGr are used, for instance, the adjustment value calculation section 323 may make the adjustment value SAOAdj greater than the adjustment value SAOAdj in unidirectional prediction in which only one reference image IMGr is used. In a case where the prediction mode information indicates the bidirectional prediction mode, in other words, the adjustment value calculation section 323 may adjust the evaluation value (SAO cost) on the band offset in the direction such that the selection of the band offset may be reduced, in comparison with a case where the prediction mode information indicates a unidirectional prediction mode. In a case where the prediction mode is a skip mode, the adjustment value calculation section 323 may adjust the evaluation value (SAO cost) on the band offset in the direction such that the selection of the band offset may be reduced, in comparison with a case where the prediction mode is the bidirectional prediction mode other than the skip mode.

Figure 5:
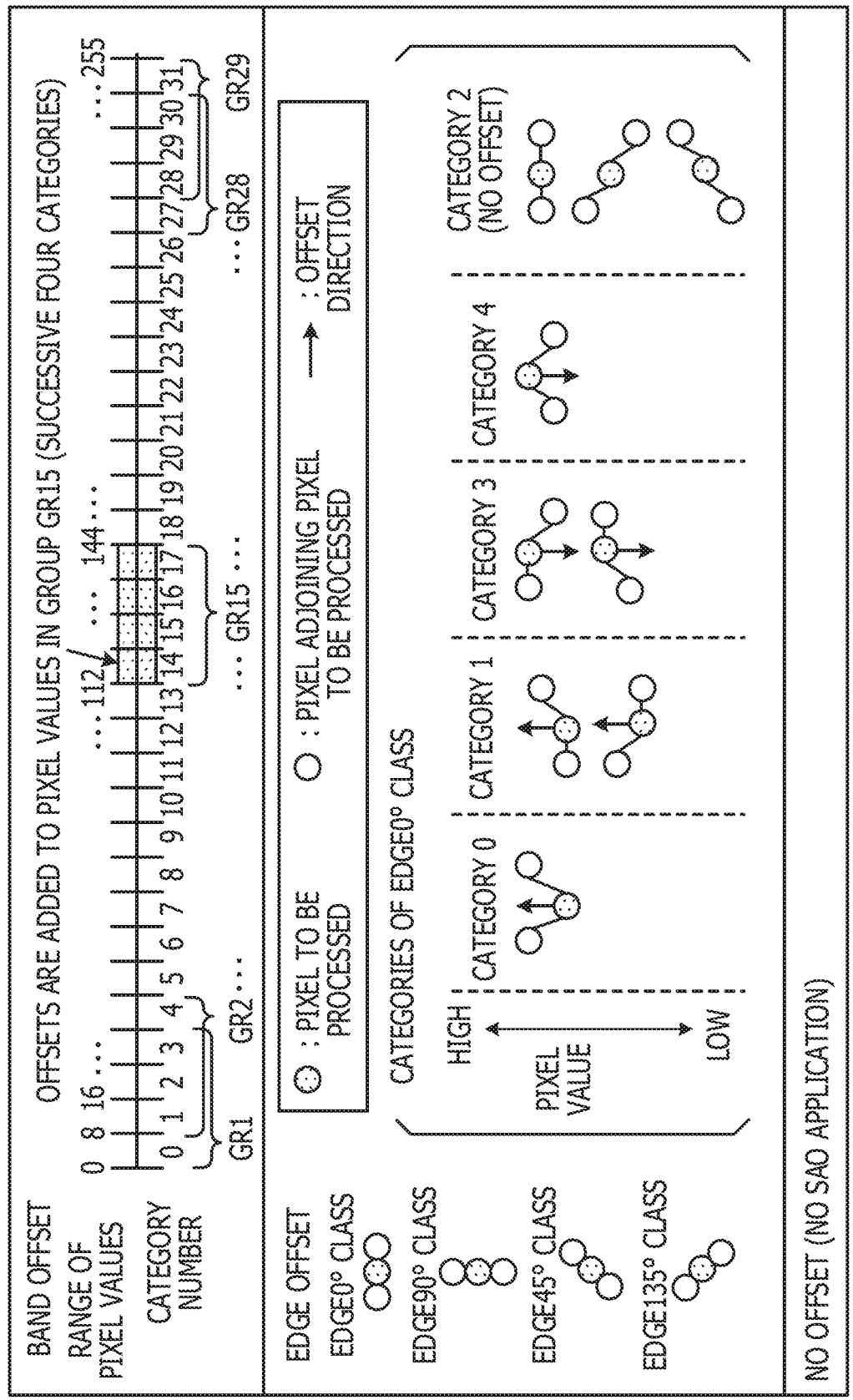
FIG. 5 is a diagram illustrating an example of SAO types.

FIG. 5 illustrates an example of the SAO types. In HEVC, there are three SAO types that are the band offset, the edge offset, and the no offset (no SAO application).

In the band offset, the range (256 tones on condition that a number of bits of the pixel values is 8-bit, for instance) of the pixel values is partitioned into 32 compartments (categories). Among a plurality of groups GR (GR1, GR2, . . . , GR15, . . . , GR28, GR29) each including successive four compartments, the offsets are added to only one group GR. In the example illustrated in FIG. 5, the offsets are added to only pixel values (112 to 144) included in the group GR15 (shaded part in FIG. 5) among the values of the pixels in the decoded image IMGdf.

The evaluation value calculation section 321 calculates an average value of the errors between the block IBLi (original image) to be coded and the decoded image IMGdf (decoded image for which SAO has not yet been carried out) and determines the offset for each of the 32 compartments, for instance. The evaluation value calculation section 321 calculates a group cost BOCost(GR) represented as sum of squares of errors in values of corresponding pixels between the block IBLi to be coded and the decoded image IMGdf, for each of 29 groups GR. The evaluation value calculation section 321 selects a group GR having the highest group cost BOCost(GR) among the 29 groups GR, as a group GR (particular successive four compartments) of the pixel values to which the offsets are to be added by the band offset. That is, the evaluation value calculation section 321 selects the group GR in which the greatest relief by the band offset from the coding error in the decoded image IMGdf is anticipated. The group cost BOCost(GR) may be represented by expression (5).

$$BOCost(GR)=\Sigma((PXi-PXdf)^2) \qquad (5)$$

In expression (5), characters "PXi" represent a value of a pixel in the block IBLi to be coded and characters "PXdf" represent a value of a pixel in the decoded image IMGdf.

In the example illustrated in FIG. 5, the group GR15 is selected as a subject of the band offset. In the band offset, for instance, the offsets are added to the pixel values that belong to the group GR15 so that the pixel values which belong to the group GR15 and which have undergone the band offset may be approximated to a pixel value (128) at a center of the group GR15.

As illustrated in FIG. 5, the edge offset is classified into four classes, that is, Edge 0° class, Edge 90° class, Edge 45° class, and Edge 135° class. Each of the classes is classified into five categories, that is, category 0 to category 4, in accordance with a relationship in pixel value between pixels adjoining a pixel (shaded circle) to be processed and the pixel to be processed. An example of the categories of Edge 0° class is illustrated in tortoise shell brackets illustrated in FIG. 5. Arrows provided on the pixel to be processed illustrated in FIG. 5 each denote a direction of the offset. The evaluation value calculation section 321 selects a class and a category in which the greatest relief by the edge offset from the coding error in the decoded image IMGdf is anticipated among the five categories in the four classes, as with the band offset.

In the no offset, the offset is not added to any of the pixels in the decoded image IMGdf.

FIG. 6 illustrates an example of operations of the information processing apparatus 102 illustrated in FIG. 3. The operations illustrated in FIG. 6 represent an example of the information processing method. A program that causes the information processing apparatus 102 such as a computer to execute the operations illustrated in FIG. 6 is an example of the information processing program. The operations illustrated in FIG. 6 are carried out for each image to be coded.

In step S100, the information processing apparatus 102 stores TID of the image to be coded, selected by the overall control section, in the coding information storage section 304.

In step S200, the motion search section 204 carries out a motion search in which the reference image IMGr is searched and in which a block that is most similar to the block IBLi to be coded is detected as the reference block. Thus the motion vector MV is calculated. The coding section 202 codes the block IBLi to be coded with use of the motion vector MV or the like. The decoding section 222 decodes the coded block (data IMGc quantized by the quantization section 214) and thereby generates the local decoded image IMGd. The deblocking filter section 230 carries out the deblocking filtering for the local decoded image IMGd and thereby generates the decoded image IMGdf.

In step S220, the static region determination section 302 determines whether the block IBLi to be coded is the static region or not. For instance, the static region determination section 302 determines that the block IBLi to be coded is the static region in a case where the magnitude of the motion vector MV calculated in step S200 is equal to or smaller than a specified value. In a case where the block IBLi to be coded is the static region, the operations of the information processing apparatus 102 proceed to step S240. On the other hand, in a case where the block IBLi to be coded is not the static region, the operations of the information processing apparatus 102 proceed to step S300.

In step S240, the adjustment value calculation section 323 of the adaptive offset filter section 310 acquires the TID of the reference image IMGr from the coding information storage section 304. In a case where the block IBLi to be coded is coded based on the bidirectional prediction, the adjustment value calculation section 323 acquires the greater of the TIDs of the two reference images IMGr.

In step S260, the adjustment value calculation section 323 determines whether the TID of the reference image IMGr satisfies an SAO control condition or not. When TIDmax that is the greater of the TIDs of the two reference images IMGr which are referred to in the bidirectional prediction is zero, for instance, the adjustment value SAOAdj in expression (3) described above is zero. In this case, the SAO cost of the band offset is not adjusted. When the TID acquired in step S240 is zero, for instance, the adjustment value calculation section 323 therefore determines that the TID of the reference image IMGr does not satisfy the SAO control condition. That is, the adjustment value calculation section 323 determines that the TID of the reference image IMGr satisfies the SAO control condition, when the TID acquired in step S240 is equal to or greater than one. The SAO control condition is not limited to a condition of whether the TID is zero or not. In a case where the TID of the reference image IMGr satisfies the SAO control condition, the operations of the information processing apparatus 102 proceed to step S280. On the other hand, in a case where the TID of the reference image IMGr does not satisfy the SAO control condition, the operations of the information processing apparatus 102 proceed to step S300.

In step S280, the adjustment value calculation section 323 calculates the adjustment value SAOAdj for the adjustment in the SAO cost of the band offset. For instance, the adjustment value calculation section 323 calculates the adjustment value SAOAdj by substitution of a value of the TID acquired in step S240 for TIDmax in expression (3)

described above. After processing of step S280 is carried out, the operations of the information processing apparatus 102 proceed to step S300.

In step S300, the evaluation value calculation section 321 of the adaptive offset filter section 310 calculates the SAO cost for each SAO type. For instance, the evaluation value calculation section 321 calculates the SAO cost (SAOCost (Type)) of each SAO type, based on expression (2) described above. Once the processing of step S280 is carried out, the evaluation value calculation section 321 calculates the SAO cost (SAOCost(BO)) of the band offset by substitution of the adjustment value SAOAdj calculated in step S280 for SAO-Adj in expression (4). That is, the SAO cost of the band offset is adjusted so as to have an increased value in a case where the block IBLi to be coded is the static region. Thus the selection of the band offset is reduced in comparison with before the adjustment in the SAO cost of the band offset.

In step S320, the selection section 326 of the adaptive offset filter section 310 selects an SAO type that is used for filtering of step S340, based on the SAO cost calculated in step S300. For instance, the selection section 326 selects the SAO type that exhibits the lowest SAO cost among the plurality of SAO types such as the band offset, the edge offset, and the no offset, as the SAO type that is used for the offset filtering for the decoded image IMGdf.

In step S340, the execution section 327 of the adaptive offset filter section 310 carries out the offset filtering of the SAO type selected in step S320, for the decoded image IMGdf.

In step S360, the adaptive offset filter section 310 stores the coding information, including the prediction mode information that indicates the mode of the inter prediction for the block IBLi to be coded, the type information PINF that indicates the SAO type, and the like, in the coding information storage section 304. Thus the coding information, such as the type information PINF that indicates the SAO type, is retained in the coding information storage section 304 for each block.

In step S380, the information processing apparatus 102 determines whether coding of all the blocks in the image to be coded has been ended or not. In a case where any block in the image to be coded has not been coded, the operations of the information processing apparatus 102 return to step S200. Thus a series of processing from step S200 to step S380 is carried out with use of an uncoded block as the block IBLi to be coded. On the other hand, in a case where the coding of all the blocks in the image to be coded is ended, the operations of coding the image to be coded by the information processing apparatus 102 are ended.

The operations of the information processing apparatus 102 are not limited to the example illustrated in FIG. 6. For instance, the information processing apparatus 102 may omit a determination in step S260 when calculating the adjustment value SAOAdj with use of equation (3) described with reference to FIG. 3 and calculating the SAO cost of the band offset with use of equation (4).

In a case where the reference image IMGr is generated through a plurality of layers, the adjustment value calculation section 323 may acquire a number of times of the band offset executed until generation of the reference image IMGr through the plurality of layers. The greater the number of times of the band offset is, the further the adjustment value calculation section 323 may adjust the evaluation value on the band offset in the direction such that the selection of the band offset may be reduced. In a case where the reference image IMGr is the image B14 illustrated in FIG. 1B, for instance, the band offset may be carried out a maximum of four times until the image B14 is generated. The number of times of the band offset executed until the generation of each image may be retained in the coding information storage section 304 for each block or may be counted with reference to the type information PINF retained in the coding information storage section 304, for instance.

In a case where the reference image IMGr is generated through a plurality of layers, the adjustment value calculation section 323 may acquire a number of times of the bidirectional prediction executed until the generation of the reference image IMGr through the plurality of layers. The greater the number of times of the bidirectional prediction is, the further the adjustment value calculation section 323 may adjust the evaluation value on the band offset in the direction such that selection of the band offset may be reduced. In a case where the reference image IMGr is the image B14 illustrated in FIG. 1B, for instance, the bidirectional prediction may be carried out a maximum of four times until the image B14 is generated. The number of times of the bidirectional prediction executed until the generation of each image may be retained in the coding information storage section 304 for each block or may be counted with reference to the prediction mode information retained in the coding information storage section 304, for instance. In the bidirectional prediction, the motion compensation image (predictive image with the inter prediction) is generated from average values of the pixels of the two reference images IMGr. In the bidirectional prediction, therefore, averaging of the block IBLi to be coded is accelerated in comparison with the unidirectional prediction. Therefore, an adjustment in which the evaluation value on the band offset is increased with the number of times of the bidirectional prediction may reduce the iterative execution of the filtering with use of the band offset so that the occurrence of the block distortion may be reduced.

In step S220, the static region determination section 302 may determine whether the block IBLi to be coded is the static region or not, based on a cost that is calculated based on the difference between the predictive image IMGp and the block IBLi to be coded. For instance, the static region determination section 302 may acquire the cost of the inter prediction from the motion compensation image generation section 206 and, in a case where the cost of the inter prediction is equal to or smaller than a specified value, may determine that the block IBLi to be coded is the static region. In this case, the lower the cost of the inter prediction is, the further the adjustment value calculation section 323 may adjust the evaluation value on the band offset in the direction such that selection of the band offset may be reduced.

The above embodiment illustrated in FIGS. 3 to 6 may provide effects that are similar to effects of the embodiment illustrated in FIGS. 1A, 1B, and 2. In a case where the block IBLi to be coded is the static region, for instance, the information processing apparatus 102 calculates the adjustment value SAOAdj for increase in the evaluation value on the band offset, based on the layer position of the reference image IMGr in the time direction. Thus the evaluation value on the band offset is adjusted in the direction such that the selection of the band offset may be reduced, in a case where the block IBLi to be coded is the static region. As a result, the iterative execution of the filtering with use of the band offset for the block in the static region may be reduced so that the occurrence of the block distortion may be reduced. Thus the deterioration in the image quality that may be caused by the iteration of the filtering with use of the band offset in the temporal hierarchical structure may be reduced.

Above detailed description may elucidate characteristics and advantages of the embodiments. It is intended that the appended claims encompass such characteristics and advantages of the embodiments as described above unless departing from the spirit and scope thereof. A person with ordinary skill in the art is expected to easily arrive at every improvement and modification. Therefore, the scope of the inventive embodiments is not intended to be limited to the above description and may conform to appropriate improvement and equivalent included in the scope disclosed in the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus that codes moving images frame by frame with hierarchizing of the moving images in a time direction, the information processing apparatus comprising:
    a memory; and
    one or more processors that electronically communicate with the memory, and are configured to:
    code each block in a frame of the moving images with use of a reference image;
    generate a decoded image by decoding of a coded block;
    calculate evaluation values to be referred to for selection of each of a plurality of types of sample adaptive offset filtering, the plurality of types of sample adaptive offset filtering including first sample adaptive offset filtering in which offsets are added to particular pixel values, second sample adaptive offset filtering other than the first sample adaptive offset filtering among sample adaptive offset filtering in which offsets are added to pixel values, and third sample adaptive offset filtering in which no offset is added,
    determine whether a block to be coded is a static region,
    make an adjustment in the evaluation value of the first sample adaptive offset filtering, based on a layer position of the reference image in the time direction upon a determination that the block to be coded is the static region, and
    select any of the plurality of types of sample adaptive offset filtering based on the evaluation value of the first sample adaptive offset filtering having undergone the adjustment and the evaluation values of the second sample adaptive offset filtering and the third sample adaptive offset filtering and execute the selected sample adaptive offset filtering for the decoded image,
    in a case where the reference image is generated through a plurality of layers, the one or more processors acquire a number of times of the first sample adaptive offset filtering carried out until generation of the reference image through the plurality of layers and, a greater a number of times of the first sample adaptive offset filtering is, the further the one or more processors adjust the evaluation value of the first sample adaptive offset filtering in a first direction such that the selection of the first sample adaptive offset filtering may be reduced.

2. The information processing apparatus of claim 1, wherein upon determining that the block to be coded is the static region, the one or more processors make the adjustment in the evaluation value of the first sample adaptive offset filtering in the first direction such that selection of the first sample adaptive offset filtering may be reduced, based on the layer position.

3. The information processing apparatus of claim 2, wherein in a case where the one or more processors determine that the block to be coded is the static region, the one or more processors acquire type information that indicates a type of the sample adaptive offset filtering executed for the reference image and adjust the evaluation value of the first sample adaptive offset filtering based on the type information and the layer position.

4. The information processing apparatus of claim 1, wherein in a case where the one or more processors determine that the block to be coded is the static region and in a case where the block to be coded is coded by inter prediction, the one or more processors acquire prediction mode information indicating a prediction mode of the inter prediction used for coding of the block to be coded and adjust the evaluation value of the first sample adaptive offset filtering based on the prediction mode information and the layer position.

5. The information processing apparatus of claim 4, wherein in a case where the prediction mode information indicates a bidirectional prediction in which two reference images are used, the one or more processors adjust the evaluation value of the first sample adaptive offset filtering in the first direction such that the selection of the first sample adaptive offset filtering may be reduced, in comparison with a prediction in which one reference image is used.

6. The information processing apparatus of claim 5, wherein in a case where the reference image is generated through a plurality of layers, the one or more processors acquire a number of times of the bidirectional prediction executed until generation of the reference image through the plurality of layers and, the greater the number of times of the bidirectional prediction is, the further the one or more processors adjust the evaluation value of the first sample adaptive offset filtering in the first direction such that the selection of the first sample adaptive offset filtering may be reduced.

7. The information processing apparatus of claim 1, wherein the one or more processors acquire a cost calculated based on a difference between a predictive image generated from the reference image and the block to be coded and, in a case where the cost is equal to or lower than a specified value, determine that the block to be coded is the static region.

8. The information processing apparatus of claim 7, wherein the lower the cost is, the further the one or more processors adjust the evaluation value of the first sample adaptive offset filtering in the first direction such that the selection of the first sample adaptive offset filtering may be reduced.

9. An information processing method of coding moving images frame by frame with hierarchizing of the moving images in a time direction, the information processing method, executed by one or more processors, comprising:
    coding each block in a frame of the moving images with use of a reference image;
    generating a decoded image by decoding of a coded block;
    calculating evaluation values to be referred to for selection of each of a plurality of types of sample adaptive offset filtering, the plurality of types of sample adaptive offset filtering including first sample adaptive offset filtering in which offsets are added to particular pixel values, second sample adaptive offset filtering other than the first sample adaptive offset filtering among sample adaptive offset filtering in which offsets are added to pixel values, and third sample adaptive offset filtering in which no offset is added;

determining whether a block to be coded is a static region;

making an adjustment in the evaluation value of the first sample adaptive offset filtering, based on a layer position of the reference image in the time direction upon a determination that the block to be coded is the static region; and selecting any of the plurality of types of sample adaptive offset filtering based on the evaluation value of the first sample adaptive offset filtering having undergone the adjustment and the evaluation values of the second sample adaptive offset filtering and the third sample adaptive offset filtering and executing the selected sample adaptive offset filtering for the decoded image, in a case where the reference image is generated through a plurality of layers, the one or more processors acquire a number of times of the first sample adaptive offset filtering carried out until generation of the reference image through the plurality of layers and, a greater a number of times of the first sample adaptive offset filtering is, the further the one or more processors adjust the evaluation value of the first sample adaptive offset filtering in a first direction such that the selection of the first sample adaptive offset filtering may be reduced.

10. A non-transitory recording medium in which an information processing program that causes an information processing apparatus including one or more processors to execute a process of coding moving images frame by frame with hierarchizing of the moving images in a time direction is recorded, the information processing program causing the one or more processors to execute a process comprising: coding each block in a frame of the moving images with use of a reference image; generating a decoded image by decoding of a coded block; calculating evaluation values to be referred to for selection of each of a plurality of types of sample adaptive offset filtering, the plurality of types of sample adaptive offset filtering including first sample adaptive offset filtering in which offsets are added to particular pixel values, second sample adaptive offset filtering other than the first sample adaptive offset filtering among sample adaptive offset filtering in which offsets are added to pixel values, and third sample adaptive offset filtering in which no offset is added; determining whether a block to be coded is a static region; making an adjustment in the evaluation value of the first sample adaptive offset filtering, based on a layer position of the reference image in the time direction upon a determination that the block to be coded is the static region; and selecting any of the plurality of types of sample adaptive offset filtering based on the evaluation value of the first sample adaptive offset filtering having undergone the adjustment and the evaluation values of the second sample adaptive offset filtering and the third sample adaptive offset filtering and executing the selected sample adaptive offset filtering for the decoded image, in a case where the reference image is generated through a plurality of layers, the one or more processors acquire a number of times of the first sample adaptive offset filtering carried out until generation of the reference image through the plurality of layers and, a greater a number of times of the first sample adaptive offset filtering is, the further the one or more processors adjust the evaluation value of the first sample adaptive offset filtering in a first direction such that the selection of the first sample adaptive offset filtering may be reduced.

11. A method of coding images comprising:
receiving a block from a frame of a moving image;
selecting a reference image;
generating a predictive image for the block using the reference image;
decoding the predictive image;
calculating evaluation values of sample adaptive offset filtering for a plurality of sample adaptive offset filtering types;
determining whether the predictive image is a static region;
adjusting an evaluation value of band offset when a determination is made that the predictive image is a static region;
selecting one or more of the plurality of types of sample adaptive offset filtering based on the evaluation values; and
executing sample adaptive offset filtering,
in a case where the reference image is generated through a plurality of layers, acquiring a number of times of the sample adaptive offset filtering carried out until generation of the reference image through the plurality of layers and, a greater a number of times of the first sample adaptive offset filtering is, adjusting the evaluation values of the sample adaptive offset filtering in a first direction such that the selecting of the sample adaptive offset filtering may be reduced.

12. The method of claim 11, wherein the plurality of sample adaptive offset filtering types includes first sample adaptive offset filtering in which offsets are added to particular pixel values, second sample adaptive offset filtering other than the first sample adaptive offset filtering among sample adaptive offset filtering in which offsets are added to pixel values, and third sample adaptive offset filtering in which no offset is added.

13. The method of claim 11, wherein the generating comprises inter prediction.

14. The method of claim 11, further comprising quantizing the predictive image.

15. The method of claim 11, wherein adjusting comprises acquiring a temporal identification (TID) of the reference image.

16. The method of claim 15, wherein adjusting comprises adding a product of the temporal identification (TID) and a predetermined constant to the evaluation value.

* * * * *